(12) United States Patent
Sherman, Jr. et al.

(10) Patent No.: US 8,114,493 B2
(45) Date of Patent: Feb. 14, 2012

(54) POLYETHYLENE PIPE RESINS

(75) Inventors: Robert L. Sherman, Jr., Blue Ash, OH (US); Sebastian Joseph, Mason, OH (US); Charles S. Holland, Springboro, OH (US); Mick C. Hundley, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 331 days.

(21) Appl. No.: 12/387,074

(22) Filed: Apr. 28, 2009

(65) Prior Publication Data

US 2010/0272937 A1 Oct. 28, 2010

(51) Int. Cl.
- *B29D 22/00* (2006.01)
- *B29D 23/00* (2006.01)
- *B32B 1/08* (2006.01)

(52) U.S. Cl. .................. 428/36.91; 428/35.7; 428/36.9; 428/212; 428/218; 428/220; 428/500; 138/140; 138/145; 138/146

(58) Field of Classification Search ................. 428/35.7, 428/36.9, 36.91, 212, 218, 220, 500; 138/140, 138/145, 146

See application file for complete search history.

(56) References Cited

U.S. PATENT DOCUMENTS

| | | | |
|---|---|---|---|
| 6,306,996 B1 | 10/2001 | Cecchin et al. | |
| 7,223,432 B2 | 5/2007 | Cholli et al. | |
| 2007/0254990 A1* | 11/2007 | Lewoniuk et al. | 524/115 |

FOREIGN PATENT DOCUMENTS

| | | |
|---|---|---|
| WO | WO 91/18934 | 12/1991 |
| WO | WO 2007/003530 | 1/2007 |
| WO | WO 2007/149274 | 12/2007 |

\* cited by examiner

*Primary Examiner* — Michael C Miggins

(57) ABSTRACT

Disclosed is a pipe resin composition. The composition comprises a polyethylene pipe resin, a primary antioxidant, and an acid. The composition of the invention has an increased oxidative induction time (OIT) and environmental stress cracking resistance (ESCR).

17 Claims, No Drawings

POLYETHYLENE PIPE RESINS

FIELD OF INVENTION

This invention relates to polyethylene pipe resins. More particularly, the invention relates to pipe resins having increased oxidative induction time (OIT) and environmental stress cracking resistance (ESCR).

BACKGROUND OF THE INVENTION

Polyethylene resins are increasingly used for the manufacture of pipes. Thermal oxidative stability and environmental stress cracking resistance are two important measures to determine the long-term durability of pipes. Thermal oxidative stability can be measured by the oxidative induction time (OIT). The OIT is the amount of time the polymer or resin can be maintained in an oxygen atmosphere and at an elevated temperature before significant signs of oxidative degradation are observed. Environmental stress cracking is the formation of cracks in a material caused by relatively low tensile stress and environmental conditions. The environmental stress-cracking resistance (ESCR) test is usually performed by placing notched test specimens in a specified reagent under a load and recording the failure time of the specimens. The failure time is a measure of the ESCR.

While the thermal oxidative stability of polyethylene resins is usually improved by antioxidants, the environmental stress cracking resistance is often improved through the resin design. For instance, copending application Ser. No. 12/156,844, filed Jun. 5, 2008, discloses bimodal PE resins having improved cracking resistance. The ESCR value of the resin is increased by reducing the long-chain branching of the polyethylene. Co-pending application Ser. No. 12/380,519, filed Feb. 27, 2009, discloses polyolefin compositions having increased OIT. The polyolefin composition comprises a polyolefin, an acid and a primary antioxidant.

There is a continuing need in the industry for polyethylene resins having improved balance of properties suitable for pipe applications. There is a particular need for polyethylene pipe resins having both improved oxidative stability and environmental stress cracking resistance.

SUMMARY OF THE INVENTION

The invention is directed to a polyethylene composition which has both increased oxidative induction time (OIT) and increased environmental stress cracking resistance (ESCR). The composition of the invention comprises a polyethylene pipe resin, a primary antioxidant, and an acid. We surprisingly found that adding an acid and a primary antioxidant to a polyethylene pipe resin increases the OIT and/or the ESCR of the pipe resin.

DETAILED DESCRIPTION OF INVENTION

The composition of the invention comprises a polyethylene pipe resin, a primary antioxidant, and an acid. Suitable polyethylene resins for use in the composition of the invention include those which meet the requirements under ASTM D3350 "Standard Specification for Polyethylene Plastics Pipe and Fitting Materials." Many polyethylene pipe resins are commercially available, e.g., Alathon® L5008HP and L4904 from Equistar Chemicals, LP.

The polyethylene pipe resin has a density preferably within the range of 0.935 g/cm$^3$ to 0.965 g/cm$^3$, more preferably within the range of 0.945 g/cm$^3$ to 0.955 g/cm$^3$, and most preferably within the range of 0.947 g/cm$^3$ to 0.949 g/cm$^3$. The polyethylene pipe resin has a melt index MI$_2$ (as determined by ASTM D-1238 at a temperature of 190° C. and at a load of 2.16 kg) preferably within the range of 0.01 dg/min to 1 dg/min, more preferably within the range of 0.01 dg/min to 0.5 dg/min, and most preferably within the range of 0.03 dg/min to 0.1 dg/min.

Preferably, the polyethylene pipe resin is a multimodal polyethylene resin. More preferably, the polyethylene pipe resin is a bimodal or trimodal polyethylene resin. Preferred bimodal resins include those disclosed in copending application Ser. No. 12/156,844, filed Jun. 5, 2008, teachings of which are incorporated herein by reference. The bimodal resin is preferably made by a multi-reactor process which involves polymerizing ethylene in an inert hydrocarbon medium in a first reactor in the absence or substantial absence of comonomer in the presence of a catalyst system comprised of a high activity solid transition metal-containing catalyst and organoaluminum cocatalyst and hydrogen while maintaining conditions to produce a polymerizate containing a first polyethylene component having a density greater than or equal to 0.965 g/cm$^3$ and MI$_2$ from 50 to 400 g/10 min. The polymerizate is preferably devolatilized to remove substantially all of the hydrogen from it, and it is then transferred to a second reactor wherein the polymerization continues by adding ethylene, a C$_{3-8}$ α-olefin comonomer and hydrogen to the second reactor, and copolymerizing the ethylene and α-olefin at a temperature from 165 to 180° F. while maintaining the mole ratio of comonomer to ethylene in the vapor space from 0.02 to 0.15 and the mole ratio of hydrogen to ethylene in the vapor space from 0.01 to 0.10 to produce a second polyethylene component of relatively higher molecular weight and lower density than that of the first polyethylene component. The bimodal resin product preferably has a density within the range of 0.947 to 0.949 g/cm$^3$ and a high load melt index HLMI (ASTM D1238, 21.6 kg, 190° C.) within the range of 3 dg/min to 20 dg/min. Preferably the bimodal resin comprises from 49 wt % to 60 wt % of the first polyethylene component and from 40 wt % to 51 wt % of the second polyethylene component. Preferably, the comonomer in the second reactor is butene-1.

Preferred trimodal polyethylene comprises from 45 to 55 wt % of a low molecular weight ethylene homopolymer component, from 20 to 40 wt % of a medium molecular weight ethylene copolymer component and from 15 to 30 wt % of a high molecular weight ethylene copolymer component. More preferably, the multimodal polyethylene comprises from 30 to 40 wt % of a low molecular weight, ethylene homopolymer component, from 30 to 40 wt % of a medium molecular weight, ethylene copolymer component, and from 20 to 30 wt % of a high molecular weight, ethylene copolymer component. Preferably, the low molecular weight, ethylene homopolymer component has a density greater than 0.965 g/cm$^3$ and a melt index MI$_2$ within the range of 50 dg/min to 250 dg/min, the medium molecular weight, ethylene copolymer component has a density within the range of 0.945 g/cm$^3$ to 0.962 g/cm$^3$ and a melt index MI$_2$ within the range of 0.01 dg/min to 1 dg/min, and the high molecular weight, ethylene copolymer component has a density within the range of 0.855 g/cm$^3$ to 0.949 g/cm$^3$ and a melt index MI$_2$ less than or equal to 0.01 dg/min. More preferably, the low molecular weight, ethylene homopolymer component has a density within the range of 0.965 g/cm$^3$ to 0.973 g/cm$^3$ and a melt index MI$_2$ within the range of 100 dg/min to 250 dg/min, the medium molecular weight, ethylene copolymer component has a density within the range of 0.950 g/cm$^3$ to 0.962 g/cm$^3$ and a melt index MI$_2$ within the range of 0.01 dg/min to 0.1 dg/min, and the high molecular weight, ethylene copolymer component has a density within the range of 0.905 g/cm³ to 0.935 g/cm³ and a melt index MI₂ less than or equal to 0.005 dg/min. Suitable comonomers for making the medium molecular weight, ethylene copolymers and high molecular weight, ethylene copolymers are preferably selected from $C_3$-$C_{10}$ α-olefins, for example, propylene, 1-butene, 1-pentene, 1-hexene, 1-octene, 4-methyl-1-pentene, the like, and mixtures thereof.

Methods for making trimodal polyethylene are known, for instance, see WO 2007/003530. A trimodal polyethylene is preferably prepared in a continuous process with three reactors in series. An ethylene homopolymer component is made by slurry polymerization in a first reactor in the presence of a Ziegler catalyst, a solvent, and hydrogen. Suitable Ziegler catalysts include those known in the industry. See, WO 91/18934. An example of a suitable Ziegler catalyst is titanium tetrachloride with triethylaluminum cocatalyst. The Ziegler catalyst is preferably suspended in a solvent. Preferred solvents are selected from $C_5$-$C_{12}$ alkanes and cycloalkanes, including hexane, cyclohexane, octane, the like, and mixtures thereof. Ethylene is preferably continuously fed into the catalyst slurry in the first reactor. The molecular weight or melt index MI1₂ of the low molecular weight ethylene homopolymer component is controlled by the hydrogen concentration. Preferably, the hydrogen/ethylene ratio in the gas phase is within the range of 9/1 to 1/9 by volume; more preferably, the hydrogen/ethylene ratio in the gas phase is within the range of 1/1 to 5/1 by volume. The polymer slurry from the first reactor is preferably transferred to a second reactor. The polymer slurry is degassed to remove some of the hydrogen from the first reactor. Ethylene and α-olefin are fed to the second reactor and copolymerized to form a medium molecular weight, ethylene copolymer component. The ratio of α-olefin/ethylene depends on the desired density of the medium molecular weight, ethylene copolymer component. The more α-olefin is used, the lower density polymer is produced. The feed ratio of α-olefin/ethylene is preferably within the range of 0.01 to 0.05 by weight. The polymer slurry from the second reactor is preferably transferred to a third reactor. The slurry is further degassed to remove hydrogen. Preferably, the third reactor is essentially hydrogen free. Ethylene and α-olefin are fed to the third reactor and copolymerized to form a high molecular weight, ethylene copolymer component. The feed ratio of α-olefin/ethylene is preferably within the range of 0.05 to 0.2 by weight and more preferably from 0.1 to 0.2 by weight. The polymerization temperatures in the reactors can be the same or different. Preferably, the polymerization temperature is within the range of 50° C. to 150° C., more preferably within the range of 50° C. to 100° C. The slurry from the third reactor is flashed and dried to remove the solvent and residual monomers.

Suitable primary antioxidants include those known to the polyolefin industry. Commonly used primary antioxidants include hindered phenols and secondary aromatic amines. These primary antioxidants terminate free radicals by transferring hydrogen from the OH or NH groups to the free radical. The resulting phenoxy and amino radicals are stable and thus do not abstract hydrogen from the polyolefin. Preferably, the composition of the invention further comprises a secondary antioxidant. Secondary antioxidants decompose hydroperoxides into non-radical, thermally stable products. Phosphite and thio compounds, for example, are secondary antioxidants. Usually, a combination of primary and secondary antioxidants yields synergistic stabilization effects. Preferably, the primary antioxidant is a phenolic antioxidant. An example of suitable phenolic antioxidants is pentaerythrityl tetrakis(3-(3,5-di-tert-butyl-4-hydroxyphenol)propionate), which is commercially available from Ciba Inc. under the name of IRGANOX®1010. Suitable phenolic antioxidants include the polymeric phenolic antioxidants. Preferably, the polymeric antioxidant has a weight average molecular weight within the range of 500 to 2,000,000, more preferably from 1,000 to 100,000, and most preferably from 2,000 to 10,000. Methods for making the phenolic polymeric antioxidants are known. For example, U.S. Pat. No. 7,223,432, the teachings of which are incorporated by reference, discloses the synthesis of phenolic polymeric antioxidants by enzyme or an enzyme mimetic capable of polymerizing a substituted benzene compound in the presence of hydrogen peroxide. Suitable amounts of primary antioxidants in the composition of the invention are preferably within the range of 0.005 wt % to 5 wt %, more preferably from 0.01 wt % to 1 wt %, and most preferably from 0.05 wt % to 0.5 wt % based on the weight of the polyethylene pipe resin. Secondary antioxidants are preferably used in amounts less than or equal to those of the primary antioxidants.

Suitable acids include organic and inorganic Bronsted acids. Examples of suitable acids include phosphoric acid, phosphorous acid, polyphosphoric acid, stearic acid, benzoic acid, lactic acid, p-toluenesulfonic acid, the like, and mixtures thereof. Preferably, the acids have a boiling point greater than the melting point of the polyethylene pipe resin, and thus the acids do not evaporate during the thermal processing of the composition. Preferably, the acid does not decompose during the thermal processing of the composition. Examples of suitable acid include phosphoric acid, polyphosphoric acid, phosphorous acid, benzoic acid, the like, and mixtures thereof. Preferably, the acid has low corrosion reactivity. Preferably, the acid is an organic Bronsted acid. Particularly preferred organic acid is benzoic acid. Preferably, the acid is present in an amount within the range of 10 ppm to 3000 ppm based on the weight of the polyethylene pipe resin. More preferably, the acid is present in an amount within the range of 250 ppm to 2000 ppm based on the weight of the polyethylene pipe resin. Most preferably, the acid is present in an amount within the range of 500 ppm to 1500 ppm based on the weight of the polyethylene pipe resin. For relatively strong acids, a low concentration is preferred to avoid corrosion to processing equipment. For instance, for phosphoric acid or phosphorous acid, a concentration from 10 ppm to 500 ppm can be particularly preferred, from 100 ppm to 500 ppm can be more particularly preferred, and from 100 ppm to 250 ppm can be most particularly preferred. The acid is present in the composition to increase the oxidative induction time (OIT) and the environmental stress resistance (ESCR). Preferably, the acid is present to increase the OIT and ESCR by at least 10% compared to a corresponding composition which does not contain the acid. More preferably, the acid is present to increase the OIT and/or ESCR by at least 50% compared to a corresponding composition which does not contain the acid.

The composition of the invention optionally comprises other additives, fillers, and modifiers. Suitable additives include foaming agents, crosslinking agents, nucleation agents, flame retardants, processing aids, antistatic agents, lubricants, optical brighteners, pigments, dispersants, UV absorbents and light stabilizers, the like, and mixtures thereof. Additives and fillers can be used in an amount up to 70 wt % of the composition. Preferably, additives and fillers are used in an amount within the range of 0.05 wt % to 15 wt % of the composition. More preferably, additives and fillers are used in an amount within the range of 0.05 wt % to 5 wt % of the composition. Most preferably, additives and fillers are used in an amount within the range of 0.1 wt % to 5 wt % of the composition. Examples of suitable foaming agents include azodicarbonamide, p-toluene sulfonyl semicarbazide, p,p'-oxybis(benzenesulfonyl hydrazide), p-toluene sulfonyl hydrazide, azobisformamide, sodium carbonate, the like, and mixtures thereof. Nucleating agents are typically high melting compounds that do not melt at the processing temperature of the polymer and remain as discrete particles embedded in polymer melt. Suitable nucleating agents include organic and inorganic compounds. Preferred nucleating agents include metal salts of organic acids, e.g., salts of sulfonic and phosphonic acids, metal salts of mono-, di- and poly-carboxylic aliphatic, substituted and unsubstituted aromatic acids, carboxylic acids, the like, and mixtures thereof. Suitable flame retardant agents include hydrated inorganic compounds such as hydrated aluminum oxides, hydrated magnesia, hydrated calcium silicate, hydrated zinc borate, hydrated calcium borate, inorganic phosphorus compounds such as red phosphorus, ammonium polyphosphate, organic phosphate compounds such as triphenyl phosphate, tricresyl phosphate, bisphenol A-bisdiphenyl phosphate, resorcinol-bisdiphenyl phosphate, nitrogen-containing organic compounds and derivatives such as melamine, guanamine, guanidine, the like, and mixtures thereof. Suitable crosslinking agents include peroxides, silane crosslinking agents, methacrylate-based agents, cyanurate-based agents such as triallyl isocyanurate (TAIC), trimethallylisocyanurate (TMAIC), triallylcyanurate (TAC), the like, and mixtures thereof. Crosslinked compositions are suitable for use, e.g., in PEX pipes. Suitable processing aids include metallic stearates, such as calcium stearate and zinc stearate, polymeric processing aids, such as fluoropolymers, the like, and mixtures thereof. Suitable fillers include talc, ground calcium carbonate, precipitated calcium carbonate, precipitated silica, precipitated silicates, precipitated calcium silicates, pyrogenic silica, hydrated aluminum silicate, calcined aluminosilicate, clays, mica, wollastonite, carbon black, the like, and combinations thereof.

The polyethylene pipe resin, primary antioxidant, acid and other optional components can be mixed by any known techniques. In one embodiment, the polyethylene pipe resin is blended with the antioxidant, and the blend is then blended with the acid. In another embodiment, the polyethylene pipe resin is blended with the acid, and the blend is then blended with the antioxidant. In still another embodiment, the acid and antioxidant are mixed, and the mixture is then blended with the polyethylene pipe resin. In one type of melt blending operation useful in this invention, the individual components are combined in an extruder such as a twin screw extruder or a polymer mixer, and therein heated to a temperature sufficient to form a polymer melt. The acid and the antioxidant can be dissolved in or diluted with water or solvents before they are blended with the polyethylene pipe resin. The mixer or extruder can be continuous or batchwise, including single screw extruders, intermeshing co-rotating twin screw extruders such as Coperion (Werner & Pfleiderer) ZSK™ extruders, and reciprocating single screw kneaders such as Buss™ co-kneaders, lateral 2-roll mixers such as Banbury™, and Farrel Continuous Mixer. The temperature of the melt, residence time of the melt within the mixer, and the mechanical design of the mixer or extruder are known variables that control the amount of shear to be applied to the composition during mixing. These variables can readily be determined by one skilled in the art based on this disclosure of the invention.

The invention includes the pipes made from the composition of the invention. Methods for producing plastic pipes are known. For instance, plastic pipe is produced by extruding molten polymer through an annular die. The pipe is formed by passing the molten extrudate through a sizing sleeve and then to a cooling tank where water is sprayed on the outer surface. The invention also includes a multilayer pipe which comprises at least one layer made from the composition of the invention.

The following examples merely illustrate the invention. Those skilled in the art will recognize many variations that are within the spirit of the invention and scope of the claims.

Comparative Example 1 and Examples 2-6

A multimodal, high density polyethylene pipe resin (Alathon® L5008HP, Equistar Chemicals, LP, density (ASTM D1505): 0.949 g/cm$^3$; MI$_2$ (ASTM D1238, 2.16 kg, 190° C.): 0.07 dg/min; and HLMI (ASTM D1238, 21.6 kg, 190° C.): 16 dg/min) is compounded with a primary antioxidant (pentaerythritol tetrakis(3-(3,5-di-tert-butyl-4-hydroxyphenyl) propionate), IRGANOX®1010, product of Ciba Inc.), a secondary antioxidant (tris(2,4-ditert-butylphenyl)phosphite, IRGAFOS® 168, product of Ciba Inc.), an acid in amounts given in Table 1, and zinc stearate and calcium stearate (1000 ppm each). The compounding is performed by a Leistritz 18 mm twin-screw co-rotating extruder at 210° C.

The environmental stress crack resistance (ESCR) is determined by the Notched Constant Tensile Load (NCTL) test (ASTM D5397) in 10% Igepal CO-630 solution (2-[2-(4-nonylphenoxy)ethoxy]ethanol, product of Rhone-Poulenc Co., Inc.) at 50° C. The average failure time of 5 specimens is reported as the ESCR value. The ESCR is directly related to the failure time.

The OIT values of the samples are determined according to the procedure of ASTM D3895. The system used to measure the OIT is TA Instruments Model 911001.902 connected to a computer running Thermal Advantage (TA) Universal Analysis 2000 (Windows 2000). The system is first calibrated with indium and tin before loading the sample and the reference pan into the cell. The samples and the reference are heated at a constant rate in an inert nitrogen environment. When the temperature reaches 200° C., the specimen is kept at 200° C. for a period of 5 minutes before changing the gas flow to oxygen. The zero point of the induction period is the point at which the nitrogen flow is switched to oxygen. The end of the induction period is signaled by an abrupt increase in the samples' evolved heat or temperature as recorded by the DSC.

The samples undergo heat aging and chlorine aging. The heat aging is performed by placing the samples (3.2 mm-thick tensile bars) in an oven at a temperature of 70° C. for three weeks. The chlorine aging is performed by placing the sample (0.25 mm-thick tensile bars) in chlorinated water containing about 100 ppm of active sodium hypochloride at 60° C. for three weeks. The aged samples are then measured for the OIT values.

The results in Table 1 show that the presence of phosphoric acid (Ex. 2, 1000 ppm), phosphorous acid (Ex. 4, 1000 ppm), and benzoic acid (Ex. 6, 2000 ppm) significantly increases the ESCR values of the composition.

The presence of phosphoric acid (Ex. 2, 1000 ppm and Ex. 3, 2000 ppm), phosphorous acid (Ex. 4, 1000 ppm and Ex. 5, 2000 ppm), and benzoic acid (Ex. 6, 2000 ppm) significantly increases the OIT value of the composition.

The presence of phosphoric acid (Ex. 3, 2000 ppm), phosphorous acid (Ex. 4, 1000 ppm and Ex. 5, 2000 ppm), and benzoic acid (Ex. 6, 2000 ppm) significantly increases the heat aging resistances of the composition.

The presence of benzoic acid (Ex. 6, 2000 ppm) significantly increases the chlorine resistance and heat resistance of the composition.

According to these examples, a skilled artisan in the industry will recognize that a preferred acid and a preferred amount of the selected acid can be varied depending on the uses of the pipes made from the composition of the invention. For instance, benzoic acid will be preferred for producing pipes, such as potable water pipes, which require strong chlorine resistance; phosphoric acid will be preferred for producing gas pipes or any other pipes which do not require strong chlorine resistance.

TABLE 1

RESULTS SUMMARY

| | Ex. No. | | | | | |
|---|---|---|---|---|---|---|
| | C. Ex. 1 | Ex. 2 | Ex. 3 | Ex. 4 | Ex. 5 | Ex. 6 |
| IRGANOX 1010 (ppm) | 1700 | 1700 | 1700 | 1700 | 1700 | 1700 |
| IRGAFOS 168 (ppm) | 1450 | 1450 | 1450 | 1450 | 1450 | 1450 |
| Phosphoric Acid (ppm) | 0 | 1000 | 2000 | 0 | 0 | 0 |
| Phosphorous Acid (ppm) | 0 | 0 | 0 | 1000 | 2000 | 0 |
| Benzoic Acid (ppm) | 0 | 0 | 0 | 0 | 0 | 2000 |
| ESCR (hr) | 310 | 540 | 360 | 540 | 270 | 540 |
| OIT (min) | 110 | 130 | 150 | 130 | 130 | 85 |
| OIT (min) 3 weeks Heat Aging | 110 | 110 | 140 | 130 | 120 | 150 |
| OIT (min) 3 weeks Cl Aging | 90 | 100 | 100 | 80 | 20 | 120 |

We claim:

1. A composition which comprises a multimodal polyethylene pipe resin, a primary antioxidant, and an acid wherein the multimodal polyethylene resin is a bimodal resin which comprises from 49 wt % to 60 wt % of a first polyethylene component and from 40 wt % to 51 wt % of a second polyethylene component, wherein the first polyethylene component has a density greater than or equal to 0.965 g/cm$^3$ and an MI$_2$ from 50 to 400 g/10 min, and the second polyethylene component has a lower MI$_2$ and lower density than that of the first polyethylene component.

2. The composition of claim 1, wherein the acid is benzoic acid.

3. A multilayer pipe comprising at least one layer of the composition of claim 1.

4. The composition of claim 1, wherein the resin has a density within the range of 0.935 to 0.965 g/cm$^3$.

5. The composition of claim 4, wherein the resin has a density within the range of 0.947 to 0.949 g/cm$^3$.

6. The composition of claim 1, wherein the primary antioxidant is a phenolic antioxidant.

7. The composition of claim 6, wherein the primary antioxidant is present in an amount within the range of 500 ppm to 5000 ppm based on the weight of the polyethylene pipe resin.

8. The composition of claim 1, wherein the acid is present in an amount within the range of 100 ppm to 3000 ppm.

9. The composition of claim 8, wherein the acid is present in an amount within the range of 250 ppm to 2000 ppm.

10. The composition of claim 9, wherein the acid is present in an amount within the range of 500 ppm to 1500 ppm.

11. An extruded pipe comprising the composition of claim 1.

12. The pipe of claim 11, which is crosslinked.

13. The composition of claim 1 wherein the acid is a phosphorus containing acid or an unsubstituted benzoic acid.

14. The composition of claim 13 wherein the acid is phosphoric acid or phosphorous acid, polyphosphoric acid.

15. A composition which comprises a multimodal polyethylene pipe resin, a primary antioxidant, and an acid, wherein the multimodal polyethylene resin is a trimodal polyethylene resin which comprises from 45 wt % to 55 wt % of a first polyethylene component, from 20 wt % to 40 wt % of a second polyethylene component and from 15 wt % to 30 wt % of a third polyethylene component, wherein the first component is an ethylene homopolymer having a density within the range of 0.965 g/cm$^3$ to 0.973 g/cm$^3$ and an MI$_2$ within the range of 100 dg/min to 250 dg/min, the second component is an ethylene-C$_{3-10}$ α-olefin copolymer having a density within the range of 0.950 g/cm$^3$ to 0.962 g/cm$^3$ and an MI$_2$ within the range of 0.01 dg/min to 0.1 dg/min, and the third component is an ethylene-C$_{3-10}$ α-olefin copolymer having a density within the range of 0.905 glcm$^3$ to 0.935 g/cm$^3$ and an MI$_2$ less than or equal to 0.005 dg/min.

16. The composition of claim 15 wherein the acid is a phosphorus containing acid or an unsubstituted benzoic acid.

17. The composition of claim 16 wherein the acid is phosphoric acid or phosphorous acid, polyphosphoric acid.

* * * * *